Nov. 23, 1926.  1,608,371
G. B. CARROLL
CARRIER
Filed April 18, 1925
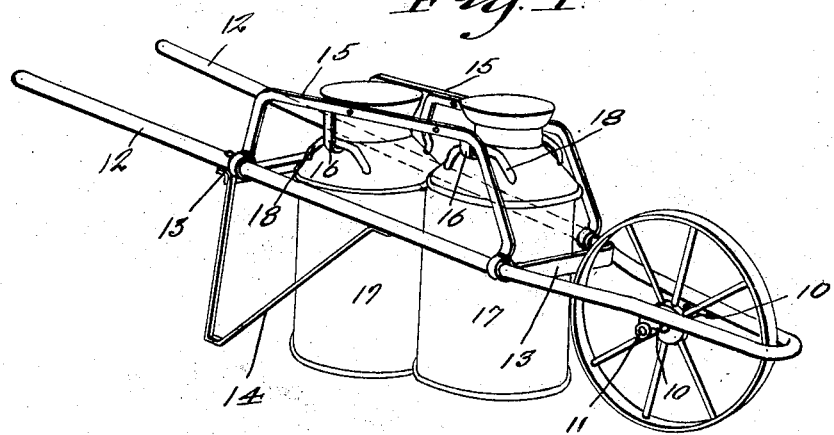
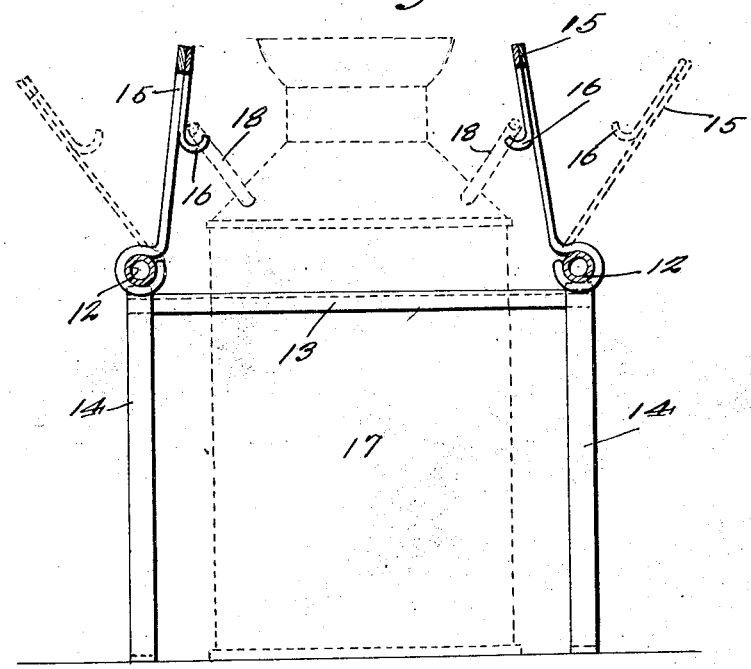

Patented Nov. 23, 1926.

1,608,371

UNITED STATES PATENT OFFICE.

GEORGE B. CARROLL, OF LANSING, MICHIGAN.

CARRIER.

Application filed April 18, 1925. Serial No. 24,255.

This invention contemplates the provision of a wheeled frame primarily designed for the purpose of supporting and transporting a number of milk cans or the like from place to place, and constructed to permit the cans to be conveniently and quickly associated with or separated from the carrier as the occasion may require.

The nature and advantages of the invention will be better understood when the following detailed description is read in connection with the accompanying drawing, the invention residing in the construction, combination and arrangement of parts as claimed.

In the drawing forming part of the application, like numerals of reference indicate similar parts in the several views, and wherein;

Figure 1 is a perspective view showing how the cans are arranged with relation to the carrier.

Figure 2 is an end elevation partly in section showing a can arranged within the carrier, and the different positions occupied by the movable side members of the frame, while the latter are being associated with the can.

The carrier forming the subject matter of this invention essentially embodies a frame which is substantially U-shaped in plan, being formed from a single length of material folded upon itself as shown. Of course, the frame can vary in size and configuration without departing from the spirit of the invention. Secured to the frame adjacent the forward end thereof are spaced bearings 10 in which is journalled the axle 11 of a wheel. The spaced parallel side members 12 of the frame are connected together by transverse braces 13, and these side members are utilized as handles to wheel the frame over the ground or surface. Each parallel side member is also provided with a support 14 by means of which the frame can be supported or rested upon the ground as shown in Figure 2.

Mounted on each side 12 of the frame is an inverted U-shaped member 15, the ends of which are looped about the side member, so that the latter can be swung inwardly or outwardly as the occasion may require. Carried by each member 15 is a plurality of hooks 16 of any suitable length, preferably of relatively different lengths as shown there being one hook on each member for each can 17 to be supported by the carrier.

As hereinabove stated, the invention is primarily intended for handling and transporting milk cans of the character indicated at 17, each can of course being provided with a pair of handles 18. The cans 17 are arranged side by side between the parallel side members 12 of the frame. The side members 15 are normally arranged to depend from the side members 12, and are adapted to be swung upwardly and inwardly to arrange the hooks 16 so that they will receive the adjacent handles 18 of the cans. When the frame is supported on the ground between the supports 14, and the side members 15 swung to the position illustrated by full lines in Figure 2, it will be noted that the hooks 16 are arranged within the handles 18 and do not engage the latter, the members 15 resting against the handles as clearly shown in Figure 2. This is due to the fact that the supports 14 for the frame are of a size to lie substantially flush with the bottom of the can 17 when all of these parts are in contact with the ground or surface. This permits the frame in its entirety and the side members 15 to be easily and conveniently arranged for association with the cans 17 after the latter have been arranged side by side as shown in Figure 1. Subsequent to the swinging of the members 15 inwardly to the positions shown by full lines in Figure 2, it is only necessary to lift the frame upwardly, whereupon the hooks 16 engage the handles 18 thereby lifting the cans off the ground so that they can be easily and conveniently moved from place to place. When it is desired to move the cans from the frame or carrier, it is only necessary to rest the can or frame on the ground as shown in Figure 2, swing the side members 15 away from the cans, which is permissible because of the fact that the hooks 16 are then separated from the handles and then lift the frame upwardly over the cans as will be readily understood. The invention is very simple in construction, convenient to handle and very meritorious for the purpose intended.

While it is believed that from the foregoing description, the nature and advantages of the invention will be better understood when the following detailed description is read in connection with the accompanying drawing, I desire to have it understood that I do not limit myself to what is herein shown and described and that such changes may be resorted to when desired as fall within the scope of what is claimed.

Having thus described the invention, I claim:

1. A carrier for containers comprising a frame formed from a single length of material and adapted to be lowered down over the containers, a wheel journaled on the frame adjacent one end thereof, inverted U-shaped members pivotally supported on the opposite sides of the frame and capable of being moved toward and away from each other, said members being arranged vertically for use, and hook like elements carried by each member and arranged to engage the handles of the containers when said frame is elevated.

2. A carrier for containers comprising a frame, a wheel journaled on the frame adjacent one end thereof, said frame including spaced side members adapted to be arranged at the opposite sides of the containers, inverted U-shaped members terminating to provide eyes embracing the side members of the frame and whereby said members are mounted for movement toward and away from each other, and adapted to be arranged vertically for use, and hook like elements of relatively different lengths carried by said members and adapted to be normally arranged to engage the handles on said containers when the frame is elevated as and for the purpose specified.

In testimony whereof I affix my signature.

GEORGE B. CARROLL.